United States Patent [19]
Lee

[11] Patent Number: 5,917,860
[45] Date of Patent: Jun. 29, 1999

[54] DIGITAL TRANSMITTER UTILIZING A PHASE SHIFTER HAVING DECOUPLED COPLANAR MICROSTRIPS

[75] Inventor: Dou-Ken Lee, Hsinchu, Taiwan

[73] Assignee: Industrial Technology Research Institute, Taiwan

[21] Appl. No.: 08/167,316

[22] Filed: Dec. 13, 1993

[51] Int. Cl.[6] .................................................. H04M 27/04
[52] U.S. Cl. ......................... 375/295; 333/117; 333/161; 375/308
[58] Field of Search ..................................... 333/117, 116, 333/120, 1, 161; 375/295, 298, 305, 308

[56] References Cited

U.S. PATENT DOCUMENTS

| | | | |
|---|---|---|---|
| 3,952,262 | 4/1976 | Jamison | 333/117 X |
| 4,224,584 | 9/1980 | Houdart | 333/116 |
| 4,567,602 | 1/1986 | Kato et al. | 332/103 X |
| 4,785,135 | 11/1988 | Ecker et al. | 333/1 X |
| 4,845,311 | 7/1989 | Schreiber et al. | 333/1 X |

FOREIGN PATENT DOCUMENTS

| | | | |
|---|---|---|---|
| 117401 | 9/1981 | Japan | 333/116 |
| 724023 | 2/1984 | U.S.S.R. | 333/116 |

Primary Examiner—Benny Lee
Attorney, Agent, or Firm—Finnegan, Henderson, Farabow, Garrett & Dunner, L.L.P.

[57] ABSTRACT

The present invention discloses an integrated circuit (IC) 200 including a plurality of microstrip conductive lines, i.e., 210, 220, 230, and 240. The IC includes a phase shifting means wherein the plurality of microstrip conductive lines, i.e., 210, 220, 230, and 240, may have different or equal lengths forming a coplanar phase-shifting assembly for shifting phase of the electromagnetic wave transmitted therein. The conductive lines, i.e., 210, 220, 230, and 240, are configured substantially rectangular in shape. The IC 200 also includes a decoupling means 280 for substantially decoupling and reducing the interference between the electromagnetic fields of the conductive lines, i.e., 210, 220, 230, and 240. The decoupling means 280 is a conductive means disposed inside the rectangular shape surrounded by the four conductive lines, i.e., 210, 220, 230, and 240, of the phase-shifting assembly. The decoupling means 280 and the microstrip conductive lines, i.e., 210, 220, 230, and 240, are configured such that the major operational characteristics of the phase shifting means are substantially compatible with the phase shifting means without the decoupling means under a presumptive no interference condition.

13 Claims, 4 Drawing Sheets

DIGITAL TRANSMITTER UTILIZING A PHASE SHIFTER HAVING DECOUPLED COPLANAR MICROSTRIPS

BACKGROUND OF THE INVENTION

1. Field of the Invention

This invention relates generally to an apparatus and method utilizing microstrip branch-lines for generating output signals of different phases. More particularly, this invention relates apparatus and method utilizing decoupled microstrip branch-lines for generating output signals of different phases wherein the prediction of the output signal characteristics is simplified with improved accuracy.

2. Description of the Prior Art

As more portable personal communication systems are made available as a result of recent progress in the semiconductor technology and packaging engineering, one difficulty often encountered in the efforts in device miniaturization is the interference of the electromagnetic fields between various circuits. This concern for interference becomes more critical when the dimensions of these circuits become smaller and the transmission lines are being formed with shorter distances from each other. On the one hand, these interference often impose limitations on the performance level, such as the bandwidth, of a device. On the other hand, since the interference is a complicated physical phenomena, the effects of caused by the interference are difficult to predict thus causing a great deal of design uncertainties and inaccuracies.

One specific example of such device is a hybrid coupler comprises microstrip branch-lines of different lengths to generate output signals of different phases. Theses couplers or phase-shifting circuits are often being employed in the microwave circuits. For the purpose of shifting the phase by a 90° or 180°, the conventional methods utilize a quarter wave length or half wave length transmission lines. However, these transmission lines become too long for implementation in the integrated circuits (ICs). In order for these coupler to be implemented in a monolithic microwave integrated circuit (MMIC), various techniques are used to reduce the dimensions of the circuit elements and the length of the transmission lines. A lumped-element approach is disclosed by Caulton et al. in 'Status of Lumped Elements in Microwave Integrated Circuits—Present and Future' (IEEE Transaction, Microwave Theory and Technology, Volume MTT-19, pp. 588–99, July 1971), which uses spiral inductors and lumped capacitors. This approach must use an empirical design method with precise inductor model derived from careful measurements of test elements. The empirical method becomes very complex at higher frequencies and thus is not practically useful for most of the modern communication applications. Gupta et al. disclose a quasi-lumped element branch-line coupler in 'Quasi-lumped Element 3 and 4-ports Networks for MIC and MMIC Applications' ('IEEE MTT-S International Microwave Symposium Digest', 1984, pp.409–411) which uses lumped capacitors and short-circuited transmission lines as inductor elements. The coupler is free from the uncertainties caused by the lumped inductors but the layout of these circuits is inconvenient for tight integration.

Hirota et al. disclose a size reduction circuit technique for constructing a hybrid coupler in 'Reduced-size Branch-line and Rat-Race Hybrids for Uniplanar MMIC's' (IEEE Transaction on Microwave Theory and Techniques, Volume 28, number 3, March 1990) which utilizes combinations of short high impedance transmission lines and shunt lumped capacitors. The size of the coupler is reduced with this technique that a 3 dB branch line coupler can be developed using transmission lines of one-eighth or one-twelfth of a wave length. The length reduction is accomplished by compensating the loss of the inductance and capacitance due to the shortening of the transmission line by increasing the 'characteristic impedance' to offset the inductance loss and by adding lumped capacitors to offset the capacitance loss.

FIGS. 1A and 1B show the circuit diagrams of a branch-line hybrid coupler wherein FIG. 1A is a traditional coupler 10 and FIG. 1B shows a coupler 20 of reduced size by the use of the technique as disclosed by Hirota et al. Referring to FIG. 1A, the length of the branch lines, i.e., 12-1, 12-2, 12-3, and 12-4 on each side of the traditional coupler 10 is quarter wave length ($\lambda g/4$) and the characteristic impedance of these branch lines are $Z_0$=50 Ω for branch lines 12-1 and 12-3, and $Z_0/\sqrt{2}$=35 Ω for branch lines 12-2 and 12-4. The size of the coupler disclosed by Hirota et al., shown in FIG. 1B, is reduced by the use of branch lines with higher characteristic impedance $Z_0$. By increasing the characteristic impedance to 70.7 ohms, the length of the branch lines of 22-1 and 22-3 is reduced to one-eighth of a wavelength ($\lambda g/8$) and the length of the branch lines 22-2 and 22-4 is reduce to one-twelfth of the wavelength ($\lambda g/12$).

As the dimension of the hybrid coupler 10 is reduced, the distances between the branch lines are also reduced. A major difficulty in design of the coupler to be operated over a variety of frequency ranges and electromagnetic field variations, such as an MMIC circuit, is to accurately predict the circuit responses under these conditions. The difficulty of accurate prediction is further compounded by the interference between the branch lines. Particularly, when the distances between these lines become smaller, the effects of the interference become more significant and may even dominate the operation characteristics of a coupler. Due to the fact that the interference of the electromagnetic field among branch lines is a complicated phenomenon and a close form analytical solution by solving a set of equations governing the dynamics of the electromagnetic fields is often not feasible. A designer of the circuits often needs to apply numerical analyses by 'running' computer programs in order to determine circuit parameters to satisfy performance specifications. Frequently, the output of the computer analyses may not be sufficiently accurate and fine tuning of the circuit may be required by adjusting the circuit configuration, e.g., length of different branch lines, or circuit elements, e.g., resistors, capacitors, etc., before the design of a circuit system, e.g., a coupler, can be finalized.

Even with the more elaborate design processes, which often increases the time and cost of the circuit design cycle, the operation of such a circuit system may still be limited by the interference. The response of a circuit system may be unstable or unpredictable in certain operation range, e.g., a certain frequency range, due to the interference. Thus the electromagnetic field interference among the circuit elements not only causes the design processes to be more complicated and costly, it may also impose undesirable operational limitations on the circuit system thus hindering its capacity to achieve higher system performance.

Therefore, there is still a demand in the art of circuit design and manufacture of MMIC and other IC devices, particularly for portable devices for application to higher bandwidth ranges, an improved circuit configuration and methodology to overcome this difficulty imposed by the electromagnetic interference among circuit elements.

SUMMARY OF THE PRESENT INVENTION

It is therefore an object of the present invention to provide a circuit configuration and method for IC circuit design such that aforementioned difficulties encountered in the prior art may be resolved.

Specifically, it is an object of the present invention to provide a circuit configuration and method for IC circuit design wherein the electromagnetic fields generated from different circuit element are decoupled to eliminate mutual interference.

Another object of the present invention is to provide a circuit configuration and method for IC circuit design wherein a ground potential is provided between two circuit elements such that the electromagnetic fields of these two circuit elements are decoupled.

Another object of the present invention is to provide a circuit configuration and method for IC circuit design wherein the interference between different circuit elements is eliminated whereby the tasks of circuit design can be simplified and the operational characteristics may be more predictably and definitely controlled.

Briefly, the basic circuit configuration for a preferred embodiment of the present invention comprises an integrated circuit (IC) including at least two microstrip conductive lines. The IC further includes a decoupling means disposed near or between the microstrip conductive lines for substantially decoupling and reducing the interference between the electromagnetic fields of the conductive lines.

It is an advantage of the present invention that it provides a circuit configuration and method for IC circuit design wherein the electromagnetic fields generated from different circuit element are decoupled to eliminated mutual interference.

Another advantage of the present invention is that it provides a circuit configuration and method for IC circuit design wherein a ground potential is provided between two circuit elements such that the electromagnetic fields of these two circuit elements are decoupled.

Another advantage of the present invention is that it provides a circuit configuration and method for IC circuit design wherein the interference between different circuit elements are eliminated whereby the tasks of circuit design can be simplified and the operational characteristics may be more predictably and definitely controlled.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
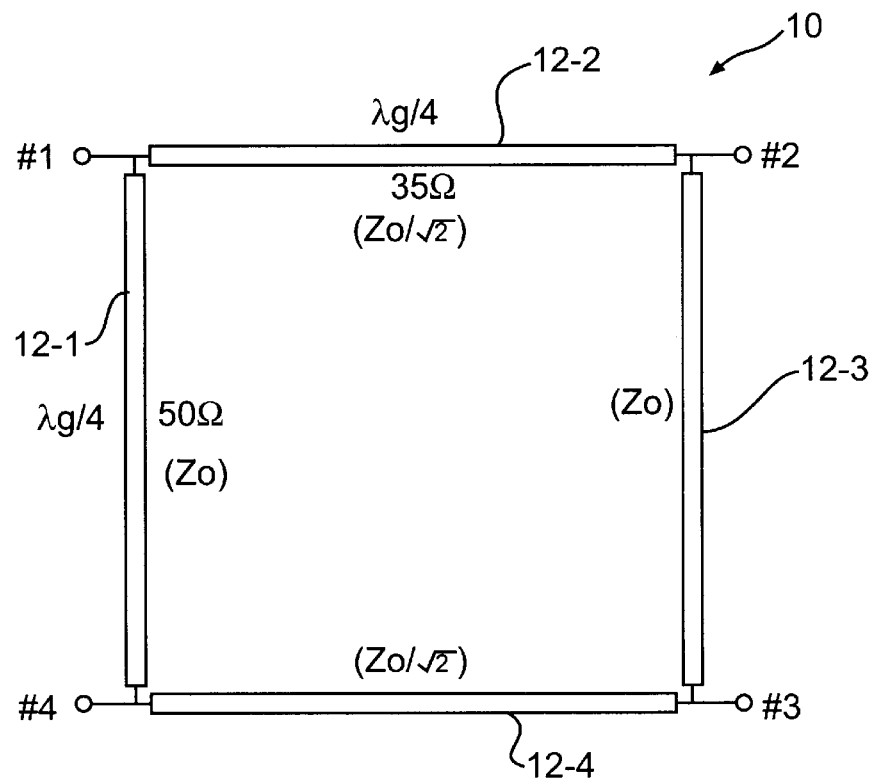
FIG. 1A is a schematic diagram of a prior art phase shifting circuit including four micro-strips of quarter-wave length.
Figure 1B:
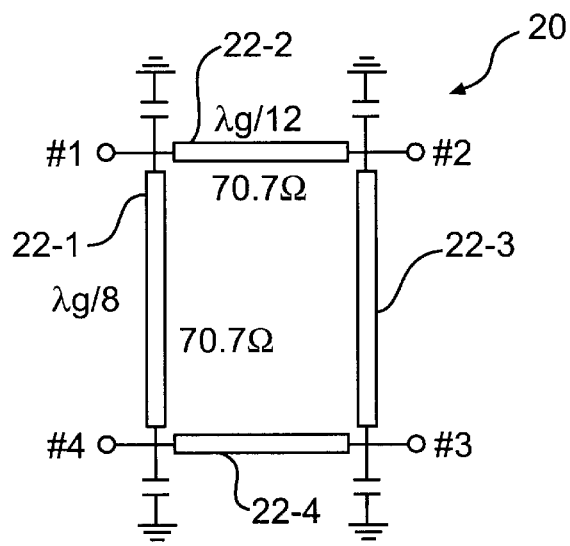
FIG. 1B is a schematic diagram of a prior art phase shifting circuit of FIG. 1 wherein the four micro-strips are of shorter lengths.
Figure 2A:
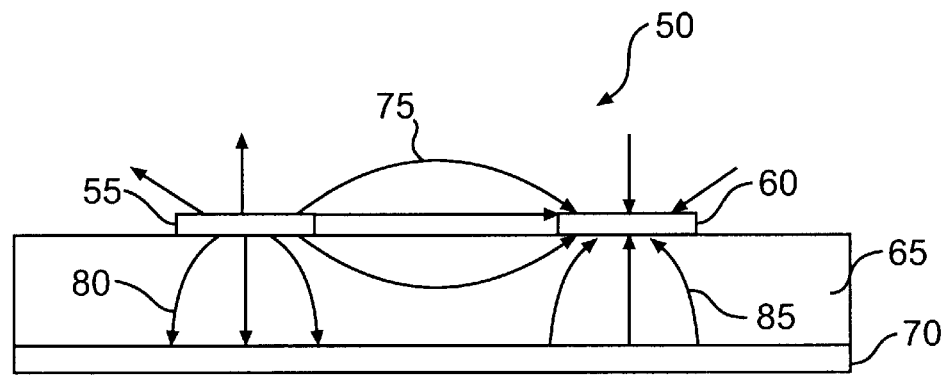
FIG. 2A is a schematic diagram of a prior art integrated circuit including microstrips.

For the purpose of comparison and explanation, please refer to FIG. 2A first wherein a prior art integrated circuit 50 is shown. The integrated circuit 50 includes two microstrips 55 and 60 disposed on a top surface of a dielectric substrate 65 near each other. The integrated circuit 50 also includes a ground potential means 70, which is typically composed of conductive materials, disposed on the bottom surface of the substrate 65. There are lines 75, 80 and 85 representing the electromagnetic field coupling these two microstrips 55 and 60 and the ground potential means 70. Due to the coupling between the microstrip lines 55 and 60, i.e., electromagnetic field represented by the lines 75, the design and operational characteristics become more difficult to predict. Fine tuning and trimming of the microstrip lines are often required after these lines are formed on the top surface of the substrate 65. The processes of trimming and fine tuning can be time consuming and labor intensive which would greatly increase the manufacturing cost of the integrated circuit 50.

Figure 2B:
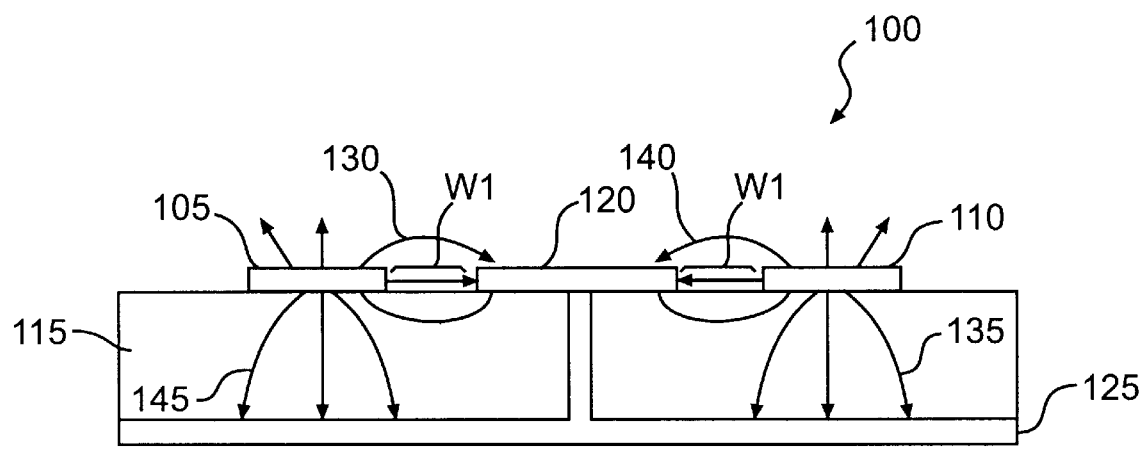
FIG. 2B is a schematic diagram of an integrated circuit including microstrips and decoupling means according to the present invention.

In contrast, a preferred embodiment of the present invention is shown in FIG. 2B wherein a simplified circuit diagram of an integrated circuit 100 is shown which includes a first and a second micro-strip 105 and 110 disposed on the top surface of a substrate 115 near each other. A decoupling means 120 is formed on the top surface of the substrate 115 between the microstrip lines 105 and 110. The decoupling means is connected to a ground potential means 125 formed on the bottom surface of the substrate 115. Similar to FIG. 2A, a plurality of lines, lines 130, 135, 140, and 145, are used to show the electric magnetic field. Because the ground potential of the decoupling means 120, there are no electromagnetic coupling between the microstrip lines 105 and 110. The coupling means 120 thus isolates the microstrip line 105 completely from the microstrip 110. The difficulties caused by the coupling and interference between two microstrip lines 105 and 110 are eliminated.

For the determination of a gap width between the microstrip lines 105 and 110 from the decoupling means 120, i.e., the distance represented by W1 in FIG. 2B, the S-parameter is used. For example, in a coplanar phase-shifting assembly, the value of the W1 is increased gradually until the S-parameter for the IC as shown in FIG. 2B approximates the S-parameter for that of a microstrip line, i.e., either 105 or 110, on the top surface of the substrate with the ground potential means 125 on the bottom assuming there is no interference. Since the simulation for computing the gap width can now be performed without requiring to take into account of the interference, the gap width can be more accurately determined with simpler and more straightforward computational methods.

Thus the present invention discloses a basic circuit configuration for a preferred embodiment of an integrated circuit (IC) 100 including at least two microstrip conductive lines 105 and 110. The IC 100 further includes a decoupling means 120 disposed near or between the microstrip conductive lines for substantially decoupling and reducing the interference between the electromagnetic fields of the conductive lines 105 and 110.

A method for configuring an integrated circuit (IC) 100 including at least two microstrip conductive lines 105 and 110 is also disclosed in this invention. The method comprises the step of providing a decoupling means 120 disposed near or between the microstrip conductive lines 105 and 110 for substantially decoupling and reducing the interference between the electromagnetic fields of the conductive lines 105 and 110.

Figure 3:
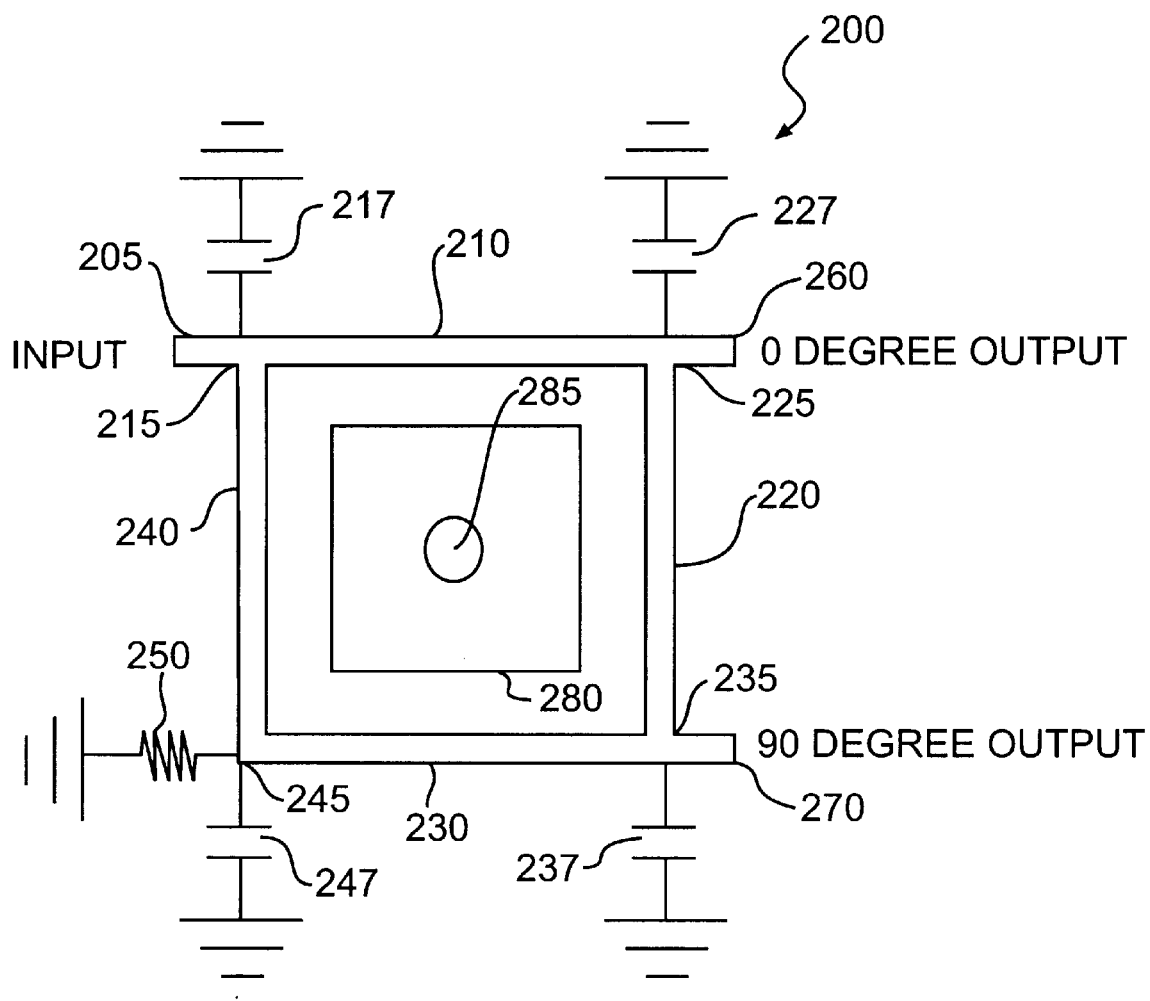
FIG. 3 is a schematic diagram of a phase shifting apparatus including microstrips and decoupling means according to the present invention.

FIG. 3 shows another preferred embodiment of the present invention wherein a phase shift circuit 200 is shown. The integrated circuit phase shifting circuit 200 has an input port 205 to accept input signals. The phase shifting circuit 200 also includes four microstrip lines 210, 220, 230 and 240 forming substantially a rectangular coplanar circuit having four corners, i.e., 215, 225, 235, and 245 wherein the corner 215 is formed by the intersection of lines 210 and 240, the corner 225 is formed by the intersection of lines 210 and 220, and the corner 235 is formed by the intersection of lines 220 and 230. Each of the corners, i.e., corners 215, 225, 235 and 245, is connected to a ground potential via a capacitor 217, 227, 237, and 247 respectively. The phase shifting circuit 200 generates, at two output ports, i.e., ports 260 and 270, four signals which of substantial equal amplitude and each has a phase which differs from the phase of a next signal by 90° while one of the output signals has the same phase with one of the input signals. Therefore, four output signals are generated with the phase for each signal being shifted by 0°, 90°, 180°, and 270° from the input signal. The corner 245 is also maintained at a certain voltage above the ground by connecting to the ground with a resistor 250. There are two output ports connected from the corners 225 and 235 wherein the lengths of the microstrip lines 210, 220, 230 and 240 are adjusted such that the signal from the output port 260 on the corner 225 has a zero degree phase difference with the input signal, and the signal from the output port 270 on the corner 235 has a ninety degree phase difference with the input signal. The phase shifting circuit further includes a decoupling means 280 which is preferably a smaller rectangular coplanar conductive sheet disposed substantially in the center of the rectangular coplanar circuit formed by the four microstrip lines 210, 220, 230, and 240. For the convenience of manufacture, a circular hole 285 is also opened in the center of the decoupling means 280.

By connecting the decoupling means 280 to a ground potential, the decoupling means 280 thus electromagnetically isolates each of these microstrip lines, i.e., lines 210, 220, 230, and 240 from each other. Almost all the coupling and interferences between these lines are therefore eliminated. The simulation for predicting the operational characteristics of the phase shift circuit 200 becomes much simplified compared to the prior art phase shifting circuit. Because design computations are now more accurate without the coupling and interference, especially for higher frequency operation, previous requirements of circuit trimming and fine tuning can now be removed. Cost savings are achieved because simpler design and manufacture processes. Furthermore, because the elimination of the interference, the circuit can be further reduced in size without being limited by the design concerns that as the lines come closer when the circuit size is reduced, the concerns for inter-coupling and interference become more severe. The overall cost of design and manufacture for the communication or data processing systems utilized the phase shifting circuit taught by this invention is therefore reduced because higher integratability can now be achieved with reduced circuit size.

The present invention thus discloses an integrated circuit (IC) 200 including a plurality of microstrip conductive lines, i.e., 210, 220, 230, and 240. The IC comprises a phase shifting means wherein the plurality of microstrip conductive lines, i.e., 210, 220, 230, and 240, may have different or equal lengths forming a coplanar phase-shifting assembly for shifting phase of the electromagnetic wave transmitted therein. The conductive lines, i.e., 210, 220, 230, and 240, are configured substantially rectangular in shape. The IC 200 also includes a decoupling means 280 for substantially decoupling and reducing the interference between the electromagnetic fields of the conductive lines, i.e., 210, 220, 230, and 240. The decoupling means 280 is a conductive means disposed inside the rectangular shape surrounded by the four conductive lines, i.e., 210, 220, 230, and 240, of the phase-shifting assembly. The decoupling means 280 and the microstrip conductive lines, i.e., 210, 220, 230, and 240, are configured such that major operational characteristics of the phase shifting means are substantially compatible with the phase shifting means without the decoupling means under a presumptive no interference condition.

Furthermore, a method for configuring an integrated circuit (IC) 200 including at least two microstrip conductive lines, i.e., lines 210, 220, 230, and 240, is disclosed in the present invention. The method comprises the step of providing a decoupling means 285 disposed near or between the microstrip conductive lines for substantially decoupling and reducing the interference between the electromagnetic fields of the conductive lines. The method may further include a step of providing a conductive means as the decoupling means 285 with substantially lower electrical potential than the microstrip conductive lines. In a preferred embodiment, the decoupling means 285 and the microstrip conductive lines may further be configured such that major operational characteristics of the IC are substantially compatible with the IC without the decoupling means under a presumptive no interference condition. In another preferred embodiment, the microstrip conductive lines which may have different lengths forming a coplanar phase-shifting assembly for shifting phase of the electromagnetic wave transmitted therein, and which employs a conductive means with ground potential near the coplanar phase-shifting assembly as the decoupling means. In another preferred embodiment, the coplanar phase-shifting assembly is formed with four of the microstrip conductive lines, i.e., lines 210, 220, 230, and 240, substantially rectangular in shape; and the decoupling means 285 is disposed inside the rectangular shape surrounded by the four conductive lines of the phase-shifting assembly.

Figure 4:
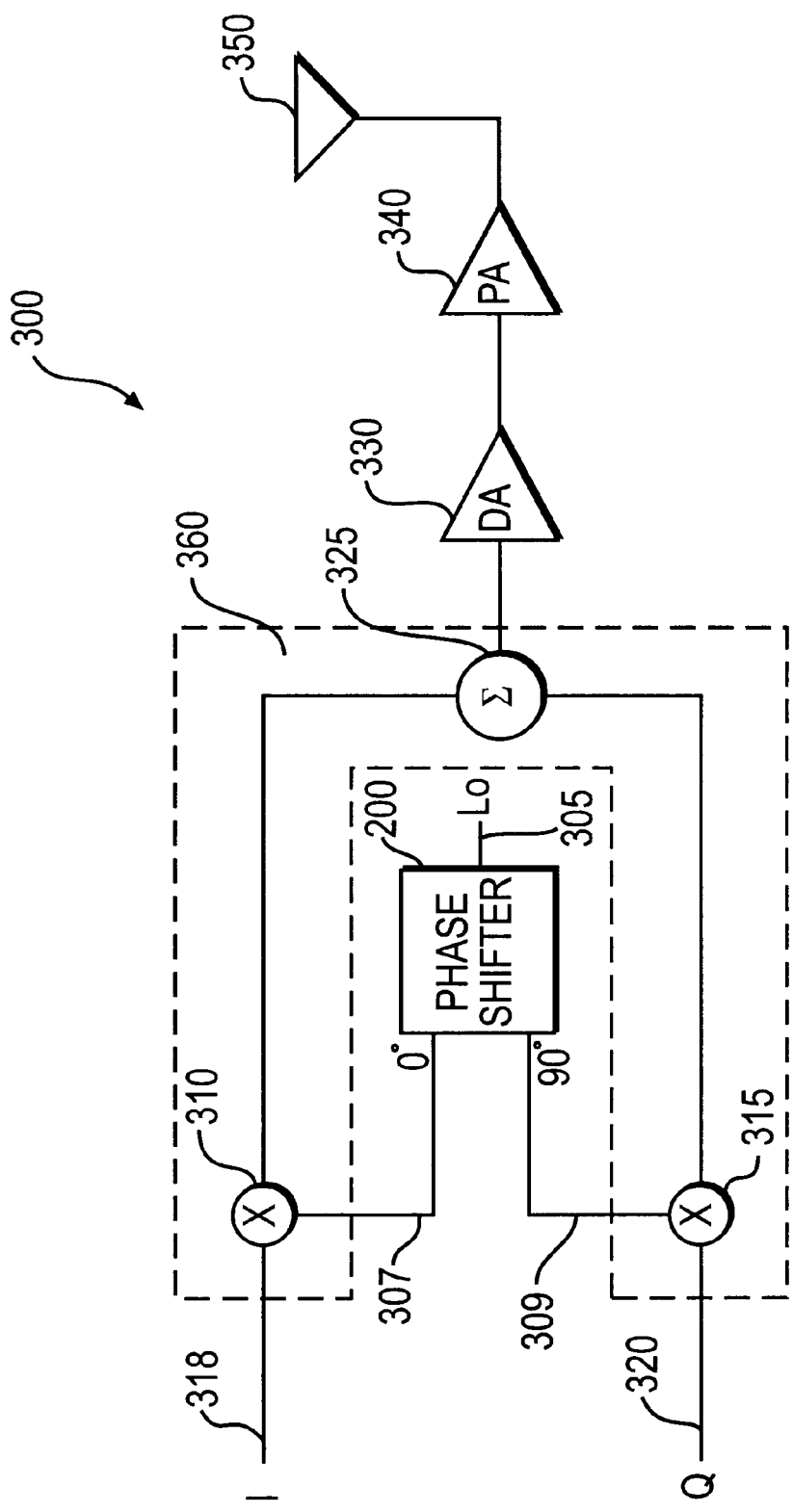
FIG. 4 is a circuit layout diagram of an IC apparatus including the phase shifting circuit of FIG. 3 according to the present invention.

FIG. 4 shows an integrated circuit (IC) device 300 implemented in a transmitter for a digital cordless telephone system, wherein the phase shifting circuit 200 of FIG. 3 is used. The digital cordless telephone system generally also includes a receiver (not shown) to receive the signal transmitted by the transmitter. Referring to FIG. 4, the IC device 300 is a power divider device generally implemented in a RF transmitter which includes a signal generator $L_0$ for generating an input signal with an input frequency and phase. The phase shifting circuit 200 receives from signal generator $L_0$ an input signal for inputting to the phase shifter 200 via an input means, e.g., an input line 305. The phase shifter 200 then generates two output signals, i.e., an in phase (0°) signal on a first output line 307 for transmitting to a first mixer 310 and a quadrature signal with a 90° phase-shift on a second output line 309 for transmitting to a second mixer 315. The first mixer 310 generates an in-phase output signal I on the in-phase output line 318 and the second mixer 315 generates a quadrature output signal Q on the quadrature output line 320. The in-phase output signal I and the quadrature output signal Q are further transmitted to a summing circuit 325 wherein a synthesized signal is generated by the summing circuit 325 which is then processed by a driver amplifier (DA) 330 and power amplifier (PA) 340 for amplifying the synthesized signal generated by summing circuit 325 before the transmitter's output signal is transmitted from an transmitting antenna 350. In a preferred embodiment, the mixers 310 and 315 and the summing circuit 325 are implemented as a 16-pin monolithic IC device 360. This monolithic IC device 360 is then incorporated as a module for the construction of the RF transmitter which can be employed in a digital European cordless telephone (DECT) system.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An integrated circuit phase shifter provided for receiving input signals and generating phase-shifted output signals in response to the received input signals, the phase shifter comprising:

four microstrip conductive lines connected in substantially a rectangular shape constituting a coplanar phase-shifting assembly; and decoupling means being substantially a rectangular conductive plate surrounded by and spaced from said phase-shifting assembly and being substantially coplanar with said four conductive lines for substantially decoupling and reducing an interference between said conductive lines in generating said phase-shifted output signals in response to said input signals, and wherein said rectangular conductive plate being disposed in a predefined position relative to said coplanar phase-shifting assembly for controlling accuracy in generating said phase-shifted output signals.

2. The integrated circuit phase shifter of claim 1 wherein:

said phase-shifting assembly is connected to a first voltage source providing said input signals; and said decoupling means is connected to a second voltage source providing a substantially lower voltage than said received input signals.

3. The integrated circuit phase shifter of claim 2 wherein:

said phase shifter with said decoupling means is configured to be substantially compatible with major operational characteristics of said phase shifter without said decoupling means under a presumptive no interference condition.

4. The integrated circuit phase shifter of claim 3 wherein said decoupling means is disposed at a ground potential.

5. The integrated circuit phase shifter of claim 4 wherein:

said coplanar phase-shifting assembly, being substantially rectangular, includes four corners wherein a first corner includes an input port for receiving said input signals and each of remaining three other corners includes an output port for providing said phase-shifted output signals.

6. A transmitter operable in a digital cordless telephone system comprises:

a signal generator for generating an input signal with an input frequency and phase;

a phase shifting device including an input means connected to said signal generator for receiving said input signal, said phase shifting device further including a phase shifting means including four microstrip conductive lines connected in substantially a rectangular shape constituting a coplanar phase-shifting assembly for generating an in-phase and a quadrature signal;

decoupling means being substantially a rectangular conductive plate surrounded by and spaced from said phase-shifting assembly and being substantially coplanar with said four conductive lines for substantially decoupling and reducing an interference between said conductive lines in generating said in-phase and quadrature signals in response to said input signal wherein said rectangular conductive plate being disposed in a predefined position relative to said phase-shifting assembly for controlling accuracy in generating said in-phase and quadrature signals;

said phase shifter with said decoupling means is configured such that major operational characteristics of said phase shifter being substantially compatible with major operational characteristics of said phase shifter without said decoupling means under a presumptive no interference condition;

signal mixer means connected to said phase shifting device for processing said in-phase and said quadrature signals from said phase shifting device;

synthesis means connected to said mixer means for receiving and synthesizing said in-phase and said quadrature signal processed by said signals mixer means for generating a synthesized signal;

a driver amplifier connected to said synthesis means and a power amplifier connected to said driver amplifier for amplifying said synthesized signal generated by said synthesized means; and a transmitting antenna connected to said power amplifier for transmitting said amplified signal from said driver amplifier and said power amplifier whereby said amplified signal may be received by a receiver in said digital cordless telephone system.

7. The transmitter of claim 6 wherein:

said signal mixer means and said synthesis means are disposed on an integrated circuit (IC) chip thereby constituting a monolithic IC device.

8. A method for configuring an integrated circuit phase shifter provided for receiving input signals and generating phase-shifted output signals in response to the received input signals, said method comprising the steps of:

connecting four microstrip conductive lines in substantially a rectangular shape constituting a coplanar phase-shifting assembly;

providing decoupling means which being substantially a rectangular conductive plate surrounded by and spaced from said phase-shifting assembly and being substantially coplanar with said four conductive lines for substantially decoupling and reducing an interference between said conductive lines in generating said phase-shifted output signals in response to said input signals; and disposing said rectangular conductive plate in a predefined position relative to said phase-shifting assembly for controlling accuracy in generating said phase-shifted output signals.

9. The method of configuring a phase shifter of claim 8 wherein:

said step of providing said decoupling means further includes a step of configuring said phase shifter with said decoupling means surrounded by and spaced from said phase-shifting assembly to be substantially compatible with major operational characteristics of said phase shifter without said decoupling means under a presumptive no interference condition.

10. The method of configuring a phase shifter of claim 8 further comprising the steps of:

connecting said phase-shifting assembly to a first voltage source for providing said input signals; and connecting said decoupling means to a second voltage source for providing a substantially lower voltage than said input signals.

11. The method of configuring a phase shifter of claim 10 wherein:

said step of connecting said decoupling means to a second voltage source for providing a substantially lower voltage than said input signals is a step of disposing said decoupling means at a ground voltage.

12. The method of configuring a phase shifter of claim 11 further comprising the steps of:

providing a first corner of said coplanar phase-shifting assembly as an input port for receiving said input signals; and providing each of remaining three corners of said coplanar phase-shifting assembly as an output port for providing said phase-shifted output signals.

13. An integrated circuit phase shifter provided for receiving input signals and generating phase-shifted output signals in response to the received input signals, the phase shifter comprising:

four microstrip conductive lines connected in substantially a rectangular shape constituting a coplanar phase-shifting assembly; and decoupling means being substantially a rectangular conductive plate surrounded by and spaced from said phase-shifting assembly and being substantially coplanar with said four conductive lines for substantially decoupling and reducing an interference between said conductive lines in generating said phase-shifted output signals in response to said input signals and wherein said rectangular conductive plate being disposed in a predefined position relative to said phase-shifting assembly for controlling accuracy of generating said phase-shifted output signals;

said phase shifter with said decoupling means is configured to be substantially compatible with major operational characteristics of said phase shifter without said decoupling means under a presumptive no interference condition.

* * * * *